Oct. 22, 1957 — W. N. KEMNITZ — 2,810,453
FILTERING ASSEMBLY
Filed July 8, 1955 — 2 Sheets-Sheet 1

Inventor:
Warren N. Kemnitz,
by Armand Cifelli
His Attorney.

Oct. 22, 1957
W. N. KEMNITZ
2,810,453
FILTERING ASSEMBLY
Filed July 8, 1955
2 Sheets-Sheet 2
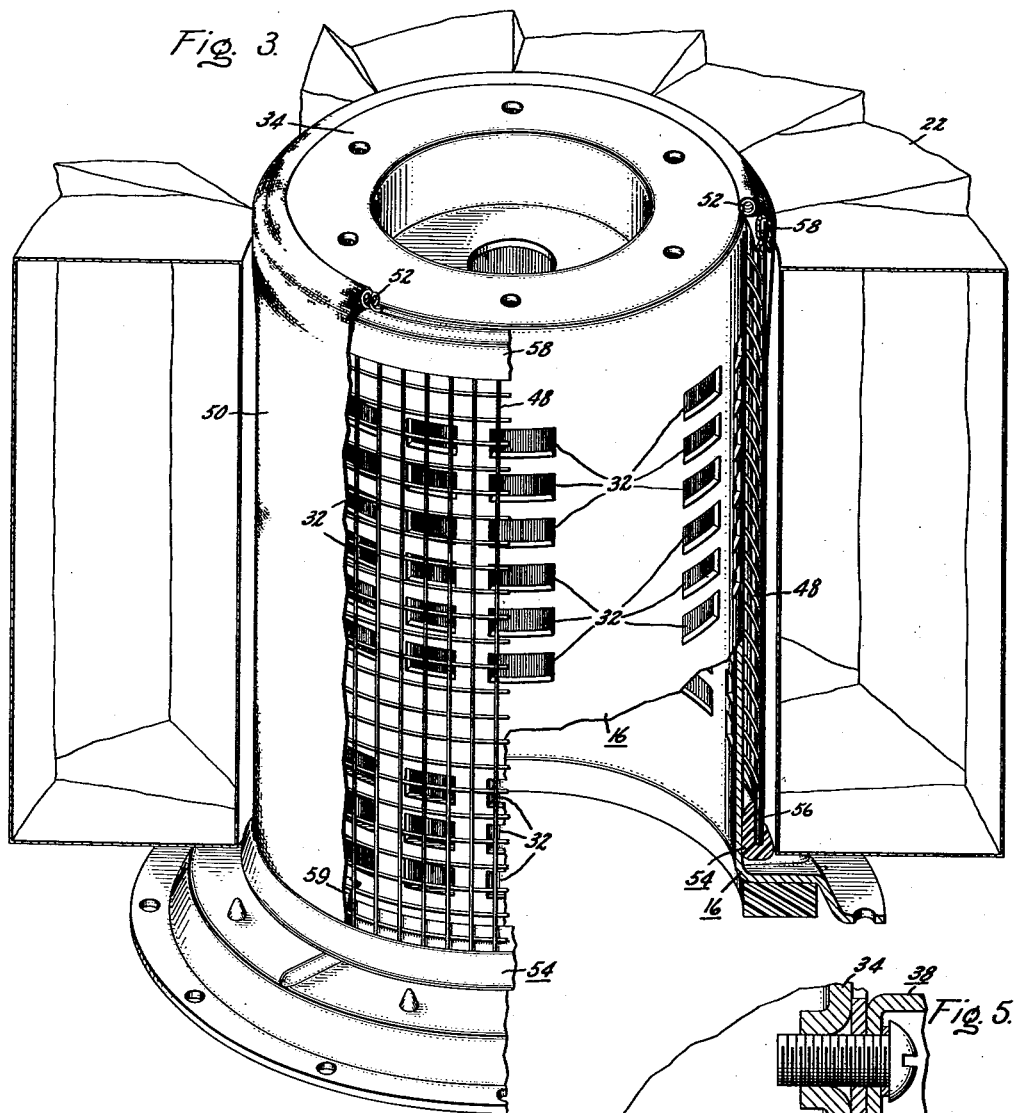
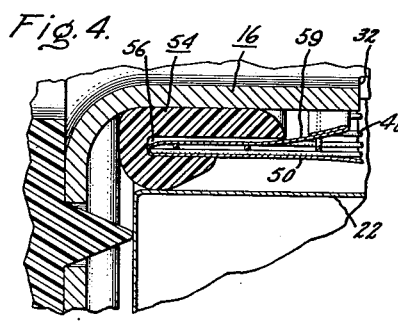
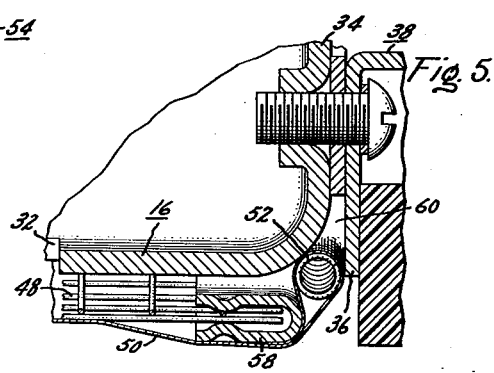
Inventor:
Warren N. Kemnitz,
by Armand Cifelli
His Attorney.

United States Patent Office 2,810,453
Patented Oct. 22, 1957

2,810,453

FILTERING ASSEMBLY

Warren Neumann Kemnitz, Willoughby, Ohio, assignor to General Electric Company, a corporation of New York Application July 8, 1955, Serial No. 520,721

8 Claims. (Cl. 183—43)

This invention relates to a filtering assembly, and particularly to one which is useful in a vacuum cleaner or the like.

The art of filtration is old and well established, however, notwithstanding its well developed state, it constantly strives for improvement. One direction in which much of its effort and energy are directed is that of providing effective, specific filtering assemblies for specific applications. In accomplishing the latter, simplicity and economy are highly prized. In many of their applications, filtering assemblies are used in conjunction with air flow producing means, usually having a guard through which dirt-laden air passes. One such application is in a vacuum cleaner, wherein it is highly desirable to provide a removable filtering assembly for use in association with the guard for the air flow producing means, which will remove most of the dirt from the air. It should be realized that a vacuum cleaner is merely exemplary of one particular use for filtering assemblies contemplated by the instant invention.

It is an object of this invention to provide an inexpensive, easily assembled and replaced, filtering assembly having many practical applications.

The object of this invention is accomplished in one form by providing a filtering assembly which is adapted to be removably secured to a perforate member through which a dirt-laden air stream passes.

The above and other objects and further details of that which I believe to be novel and my invention will be clear from the following description and claims taken with the accompanying drawings wherein:

Figure 3 is a perspective view, with portions cut away and shown in section for the purpose of clarity, of the improved filtering assembly shown associated with a perforate member.

Figure 4 is a sectional view showing a portion of Figure 1 on an enlarged scale.

Figure 5 is a sectional view showing another portion of Figure 1 on an enlarged scale.

Figure 1:
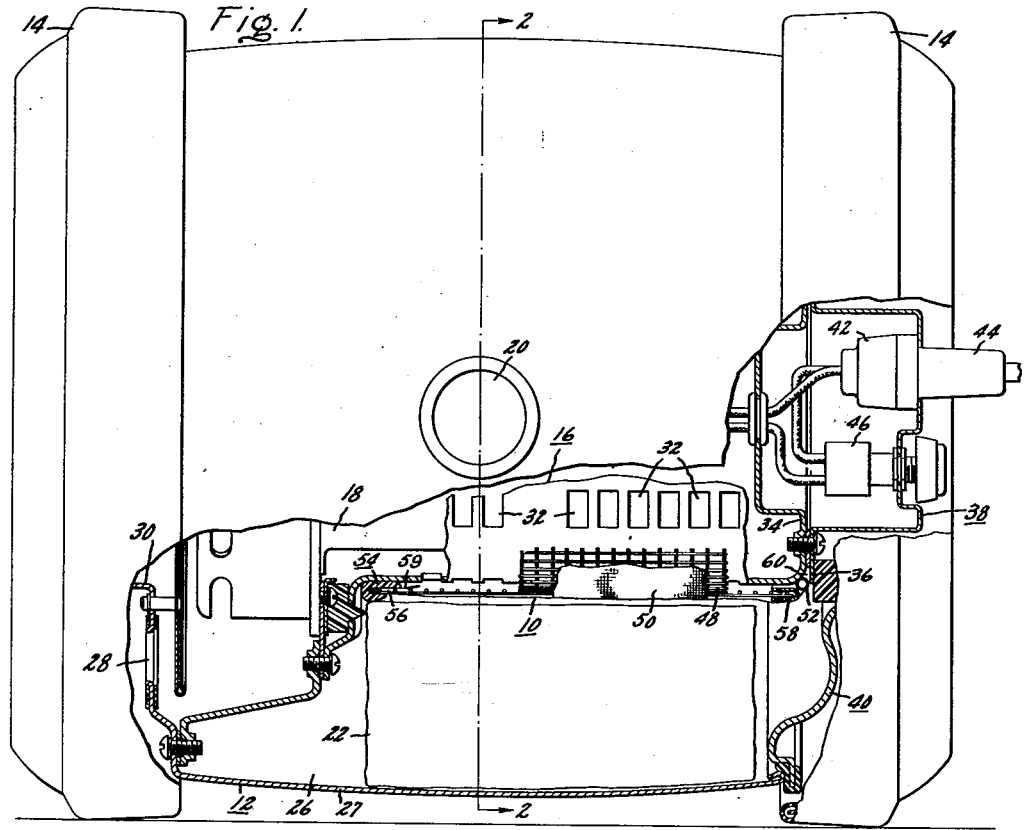
Figure 1 is an elevation view, with portions cut away and shown in section for the purpose of clarity, of a vacuum cleaner incorporating the improved filtering assembly.

Referring to the drawings, the improved filtering assembly is shown therein as being incorporated in a vacuum cleaner. It should be clearly understood that the improved filtering assembly may be used in other environments; generally, it may be used wherever it is desired to filter dirt out of a dirt-laden air stream, and specifically, it may be used wherever a dirt-laden air stream passes through a perforate wall and it is desired to filter the dirt from the air stream. A vacuum cleaner is one application in which the latter conditions obtain, for in vacuum cleaners there is normally provided an air flow producing means and a perforate wall. In a vacuum cleaner application, the air flow producing means often comprises a fan-motor unit, and the perforate wall part of a guard for the unit. The improved filtering assembly, however, does not necessarily have to be used in conjunction with such a guard, and the air flow may be created by any means.

In Figure 1 of the drawings the improved filtering assembly is designated generally by reference numeral 10, and it is shown as being incorporated in a cylindrical vacuum cleaner 12 that is mounted on a generally horizontal axis and supported for movement on a pair of wheels 14. For the purposes for the present invention it is not necessary that a vacuum cleaner be mobile, that is, mounted on wheels, the invention being illustrated in such an environment merely for the purpose of exemplification. The filtering assembly 10 is illustrated as being generally cylindrical, and is disposed concentrically about a perforate cylindrical wall 16 which constitutes a guard for the air flow producing, fan-motor unit 18. The manner in which the perforate wall 16 is mounted on the fan-motor unit 18 forms no specific part of this invention, however, it is believed that this will be apparent from a glance at Figure 1.

The vacuum cleaner 12 includes an air inlet 20 which is adapted to have a hose (not illustrated) coupled thereto in any conventional manner. Within the cleaner 12 there is disposed a filter in the form of a C-shaped, flexible filtering bag 22 (see Figure 2) which is in communication with the inlet 20 by virtue of its being mounted in mounting bracket 24, which is connected to the cleaner. Filtering bag 22 when used in conjunction with the filtering assembly 10 constitutes the primary filter and the filtering assembly 10 constitutes a secondary filter. However, if it is desired the filtering bag 22 may be omitted and the filtering assembly 10 may be utilized to constitute the primary filter. The particular manner of mounting the filtering bag 22 to the bracket 24 to place the filtering bag in communication with the inlet 20 forms no specific part of my invention. An effective arrangement for accomplishing the latter is described and claimed in the copending application of W. N. Kemnitz and G. H. Bramhall, Serial No. 411,056 filed February 18, 1954, now Patent No. 2,771,152 dated November 20, 1956, and assigned to same assignee as that of the instant application.

Figure 2:
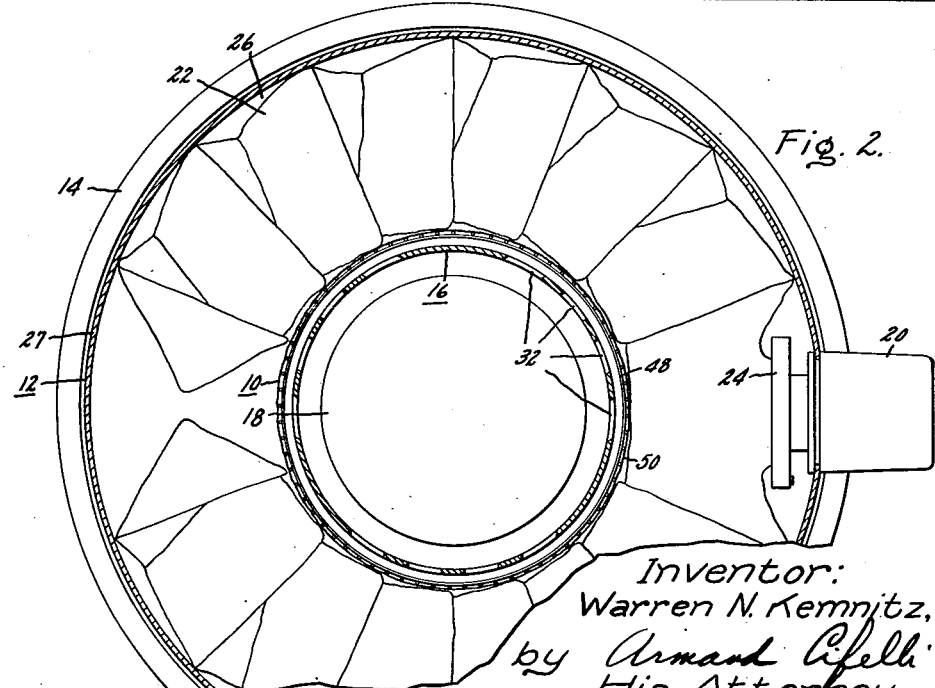
Figure 2 is a sectional view taken on line 2—2 of Figure 1.

It will be observed from Figures 1 and 2 that the filtering bag 22, if employed, is disposed in an annular filtering chamber 26 which is formed between the perforate cylindrical wall 16 and the outer cylindrical wall 27 of the cleaner 12. For the purpose of completeness, and in order that the flow of air through the vacuum cleaner may be understood, a plurality of outlet openings 28 are illustrated in the end wall 30 of the vacuum cleaner 12 for the purpose of permitting air to discharge out of filtering chamber 26 into the atmosphere. It will, therefore, be understood that the dirt-laden air enters through an inlet hose, passes through the inlet 20, the filtering bag 22, if one is used, through the filtering assembly 10, through the openings 32 in the perforate wall 16, through the fan-motor unit 18 and out the openings 28 in the end wall 30 to the atmosphere. If a filtering bag is employed, most of the dirt will be separated from the air stream and collected in the bag. Any dirt or dust that passes through the filtering bag will be separated from the air stream by the filtering assembly 10. If a filtering bag is not employed, all of the filtration will be accomplished by the filtering assembly 10.

With reference to the right-hand side of Figure 1 and to Figure 5, it will be seen that the perforate wall 16 has an annular groove-like cavity 60 at its right-hand end, which is formed by the top 34 of the perforate member 16 and the peripheral portion of the mounting flange 36 of axially extending cap member 38. The right-hand wheel 14 is part of a wheel and lid assembly 40 which is removable as a unit for the purpose of permitting access into the filtering chamber 26. The structural details of the wheel and lid assembly form no part of the present invention, nor does the manner of removably mounting the wheel and lid assembly 40 on the cap member 38. The cap member 38 may support a receptacle 42 for receiving a detachable electric plug 44, and an electrical switch 46. The receptacle and switch mounting and portions of the wheel and lid assembly are disclosed and claimed in copending application Serial No. 427,998 of F. P. Hayba, filed May 6, 1954, and assigned to the assignee of the instant application.

The detailed construction of the filtering assembly 10 can best be seen in Figure 3, where it is shown in association with the perforate wall 16 which acts as a fan-motor guard in the vacuum cleaner application illustrated. It comprises a perforate cylinder 48 which may be in the form of a metallic or non-metallic wire mesh screen or the like, which receives a closely embracing and surrounding cylindrical filtering member 50 made of a filtering material, such as a fabric or paper composition. If the filtering assembly 10 is used in association with a guard, the openings in perforate cylinder 48 are smaller than openings 32 in the guard. Regardless of its environment of use, the perforate cylinder 48 prevents the collapse of filtering member 50, which performs most of the filtering effected by the filtering assembly.

One end of the member 50 supports a spring ring 52, such as a garter spring; this is accomplished by looping the axial end of the member 50 around the spring ring and securing said end to the member, as by sewing (see Fig. 5). Spring ring 52 has an unstressed internal diameter which is less than the external diameter of cylinder 48. An annular resilient gasket 54 having an axially facing annular groove 56 formed therein and an annular metallic clip 58 which is U-shaped in cross-section complete the components of the filtering assembly.

To assemble the components into a filtering assembly such as is illustrated in Figure 1, the filtering member 50 is slid onto the perforate cylinder 48 and the axial end 59 of the filtering member 50 is bent around one axial edge of the cylinder 48 and forced against its internal surface. The end 59 of the filtering member 50 and the adjacent end of perforate cylinder 48 are inserted into the annular groove 56 of the resilient gasket 54. The annular clip 58 is forced onto the other end of the perforate cylinder 48 and disposed within the filtering member 50. The edge of the filtering member 50 having the spring 52 secured therein extends axially beyond the end of the perforate cylinder 48 and the clip 58, and is contracted by the spring ring 52, thereby stretching the member 50 over the cylinder 48, and maintaining it in tension. The filtering assembly just described may be used alone or in association with any cylindrical perforate member.

In the vacuum cleaner application illustrated, the filtering assembly is associated with the perforate wall 16, therefore, in order to securely mount the assembly, the diameter of the resilient gasket 54 is selected so that it closely embraces the outer surface of the perforate wall 16; this anchors the filtering assembly at one end. The other end of the filtering assembly 10 is anchored by the spring ring 52, which is received in the annular cavity 60 formed by the top 34 of the wall 16 and the flange 36 of the cap 38. It should be realized that this annular cavity may be in the form of a groove or simply a shoulder formed in the perforate member, if this is convenient. In the particular application of the filtering assembly illustrated, a convenient annular cavity is provided between the aforementioned top 34 and flange 36, both of which are necessary for other purposes in a vacuum cleaner of the type illustrated. When in assembled position, it will be observed that the filtering assembly is anchored at one end by the friction between the resilient gasket 54 and the perforate wall 16, and it is anchored at its other end by the spring ring 52 which is seated in the annular cavity 60, and which contacts an axially disposed edge portion of the clip 58 to thereby assist in retaining the entire assembly securely in place.

From the foregoing it will be observed that a filtering assembly has been provided which is simple, easily assembled and disassembled. The filtering assembly may be used with or without a perforate member; if used without such a member, it is necessary that a support be provided for the gasket and an annular portion for the spring ring. If the filtering assembly is used with a perforate member, as is illustrated, to disassemble the assembly it is only necessary to reverse the procedure set forth for assembling it, i. e., expand the ring member 52, move it radially out of the cavity 60 and axially onto the outer face of the perforate cylinder 50; thereafter, the entire assembly may be slid axially off the perforate wall 16.

As will be evident from the foregoing description certain aspects of my invention are not limited to the particular details of construction of the example illustrated, and I contemplate that various and other modifications will occur to those skilled in the art. It is, therefore, my intention that the appended claims will cover such modifications and applications as do not depart from the true spirit and scope of my invention.

What I claim as new and desire to secure by Letters Patent of the United States is:

1. A filtering assembly comprising a perforate cylinder, a cylindrical filter member surrounding and closely embracing said cylinder, a resilient gasket secured to and carried by one end of said cylinder and one end of said member to thereby retain these ends together, the other end of said member extending axially beyond the other end of said cylinder, and a spring ring secured to and carried by the other end of said member and adapted to retain said other ends adjacent each other, whereby the filtering assembly may be utilized as a unitary assembly.

2. A device as defined in claim 1 wherein said cylinder is a screen and said member is made of a flexible filtering material.

3. A device as defined in claim 1 wherein said gasket and said ring comprise means for mounting said assembly to a support.

4. A device as defined in claim 1 wherein said ring comprises an expansible spring having an unstressed internal diameter which is less than the external diameter of said cylinder, whereby said ring normally maintains said member in tension.

5. A device as defined in claim 1 wherein said member overlaps said cylinder at its gasket secured end and extends around the axial edge of and into said cylinder.

6. A unitary filtering assembly for use with a perforate cylindrical wall having an annular cavity in its outer surface, comprising a perforate cylinder adapted to surround said wall, the openings in said cylinder being smaller than the openings in said wall, a cylindrical filtering member surrounding said cylinder, a resilient annular gasket secured to and carried by one end of said member and one end of said cylinder to thereby retain these ends together, the other end of said member extending axially beyond the other end of said cylinder, said gasket having an internal diameter such that it closely embraces said wall, and a spring ring secured to and carried by the other end of said member and adapted to be seated in said cavity when said assembly is positioned on said support by said gasket in such a manner that said ring is located adjacent to said cavity.

7. A device as defined in claim 6 wherein said member overlaps said cylinder at its gasket secured end and extends around the axial edge of and into said cylinder.

8. A device as defined in claim 6 wherein an annular clip is secured to said cylinder at its end adjacent to the spring ring, and said ring is expansible, has an unstressed internal diameter less than that of said cylinder, is disposed axially beyond said clip and is seated in said cavity in a substantially unstressed condition, whereby said member is maintained in tension and said assembly is mounted on said wall.

References Cited in the file of this patent

UNITED STATES PATENTS

| | | |
|---|---|---|
| 1,218,848 | Foster | Mar. 13, 1917 |
| 1,864,201 | Kegerreis et al. | June 21, 1932 |
| 2,258,926 | Campbell | Oct. 14, 1941 |
| 2,308,309 | Ruemlin | Jan. 12, 1943 |
| 2,532,933 | Nuffer | Dec. 5, 1950 |

FOREIGN PATENTS

| | | |
|---|---|---|
| 115,591 | Australia | July 21, 1942 |